Dec. 12, 1950  F. W. BARBKNECHT  2,533,756
MACHINE FOR BEVELING NOTCHES IN COULTER DISKS
Filed Oct. 5, 1948  2 Sheets-Sheet 2

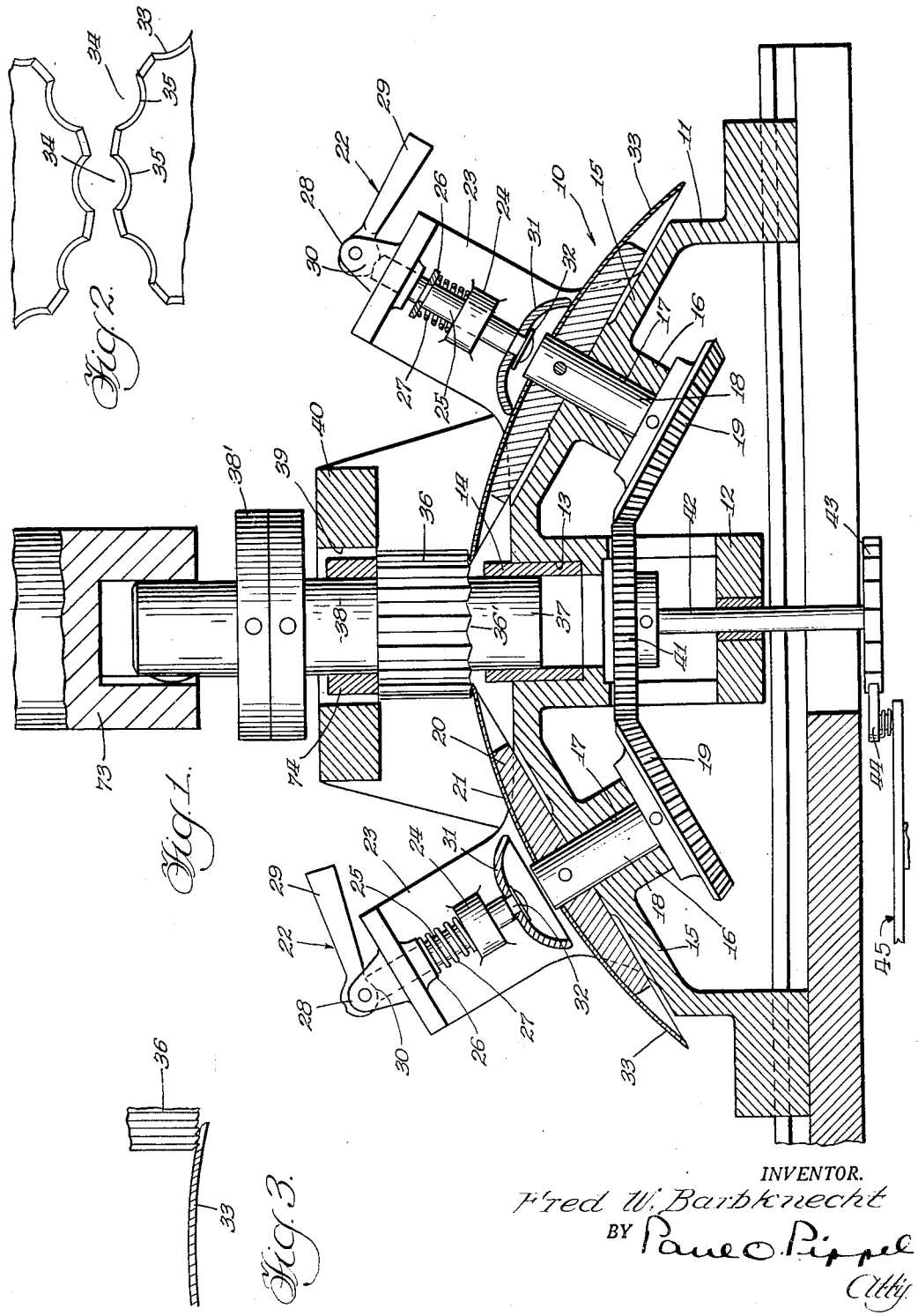

INVENTOR.
Fred W. Barbknecht
BY Paul O. Pippel
Atty

Patented Dec. 12, 1950

2,533,756

UNITED STATES PATENT OFFICE 2,533,756

MACHINE FOR BEVELING NOTCHES IN COULTER DISKS

Fred W. Barbknecht, Palos Heights, Ill., assignor to International Harvester Company, a corporation of New Jersey Application October 5, 1948, Serial No. 52,927

3 Claims. (Cl. 76—82)

This invention relates to an improved production machine for beveling the edges of discs. More particularly it relates to a machine for beveling edges of a disc having circumferentially spaced notches.

In the agricultural industry a large number of steel discs are used in various of the farm operations. In some instances the discs are concavo-convex in shape and this type of disc is generally used in a farm implement of the disc harrow type. The discs function to break the clods of soil as the machine goes over the freshly plowed ground. Likewise, a great many flat discs are used in connection with plowing operations. Discs of this type are generally referred to as coulter discs. These discs are also generally provided with circumferentially extending notches. The material of the discs adjacent and bordering the notches is generally beveled to provide a sharpened surface thereby facilitating the breaking up of the clods of soil. Many of these discs are used in the industry and a high replacement factor makes high production of the discs desirable. In the past the sharpening operation generally has been accomplished by means of an abrading machine, such as a grinder, wherein the operator held the disc up against the wheel of the grinder to sharpen or bevel the edges of the material adjacent the notched out portions. This type of operation was slow and tedious and a uniform sharpening operation did not result. In some cases the metal would be burned and thus the sharpened edges of the disc would rapidly deteriorate under operating conditions.

It is the prime object of this invention to provide a novel machine adapted to effectively sharpen the edges of flat and concavo-convex implement discs.

Still another object is to provide a novel fixture for supporting a plurality of coulter discs adjacent a rotatable element adapted to bevel the edges of the discs.

A still further object is to provide a novel machine fixture and cutting element arranged to bevel edges of material of a disc, the edges of said material lying along bordering edges of circumferentially extending notches formed in the edges of the discs.

Other objects will become more readily apparent upon an examination of the specification and drawings.

In the drawings:

Fig. 1 is a cross-sectional view through a fixture and machine for sharpening or beveling the edges of concavo-convex discs.

Fig. 2 is a fragmentary view of a pair of concavo-convex discs positioned in opposed relation.

Fig. 3 is a cross-sectional view through a concavo-convex disc showing a cutter positioned adjacent thereto.

Figure 5:
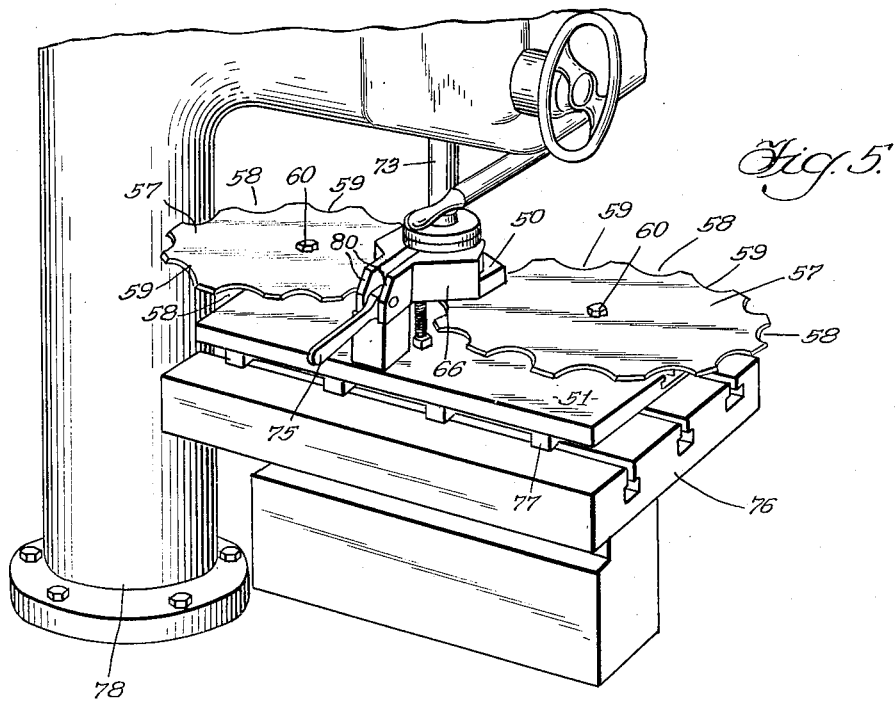
Fig. 5 is a perspective view of a disc sharpening machine placed in operating connection with a power machine.

Referring particularly to Figs. 1, 2 and 3, a machine or apparatus for treating and sharpening discs is generally designated by the reference character 10. The machine 10 includes a fixture or support 11 which may be suitably formed of cast material. The support 11 includes a centrally positioned projection 12 which is provided with a vertically extending bore 13. The bore 13 is arranged to position a bearing member 14 in axial relation. The upper portion of the support 11 includes a pair of opposed angularly extending portions 15. The portions 15 include downwardly extending projections 16, each of which is provided with a bore 17. The bores 17 extend upwardly and outwardly in diverging relation with respect to the bore 13. A shaft 18 is rotatable within each bore 17. The shaft 18 includes at its lower end a bevel gear 19 which is rigidly secured to the shaft for rotating the same. The upper end of each shaft 18 is provided with a turntable 20 rigidly secured to the shaft for rotation therewith. The turntable 20 is positioned in angular relation with respect to the bore 13, and also includes an upper convex surface 21.

Positioned at opposite sides of the bore 13 and cooperating with the turntables 20 are work holders or clamps generally designated by the reference character 22. The work holders 22 are supported on brackets 23 extending upwardly from the fixture 11. The work holders 22 are also provided with guide members 24 through which a plunger 25 reciprocates. Each plunger 25 includes a collar 26 rigidly secured to the plunger and engaging a spring 27. The spring 27 normally urges the plunger 25 upwardly. A projection 28 extends upwardly from each bracket 23. The projections 28 are arranged to rotatably support handle members 29. The handle members 29 include cam surfaces 30. The cam surfaces 30 are arranged to engage and effect movement of the plunger 25 upon rotation of the handle members 29. The lower ends of the plungers 25 are provided with cup shaped members 31. The cup shaped members 31 are rotatable on an undercut shaft extension 32 projecting downwardly from the ends of the plungers 25.

Upon downward movement of the plungers 25 during actuation of the handle members 29, the cup shaped members 31 engage upper convex surfaces of concavo-convex discs 33. As best shown in Figs. 1 and 2, the discs 33 are provided with circumferentially extending notches 34. The discs are also provided with edges 35 which border the notches 34. It is these edges 35 that are treated and beveled by the operation of the machine 10.

A cutter head 36 is positioned between the work holders 22 and the discs 33, as best shown in Fig. 1. The cutter head 36 may be of a conventional mill type of cutter and consists of an extension 37 which projects and is journalled within the bearing 14. The cutter head 36 also includes an upwardly extending shaft 38 which is rotatable in a bore 39 formed in a bracket 40. The cutter head also includes conventional type cutting edges 36'. Collars 38' are rigidly secured to the shaft 38, the collars normally resting on the bracket 40 for limiting the downward movement of the cutter. The collars 38' may be adjusted along the shaft 38. The upper end of the shaft 38 projects into a rotating or driving member 73 in a manner that will more clearly appear later.

A gear 41 and shaft 42 are positioned for rotation on the projection 12. The gear 41 is in mesh with gear 19 and is rotated by means of a ratchet wheel 43. The ratchet wheel 43 is rotated by means of a pawl 44 which may be moved by means of a link 45.

Figure 4:
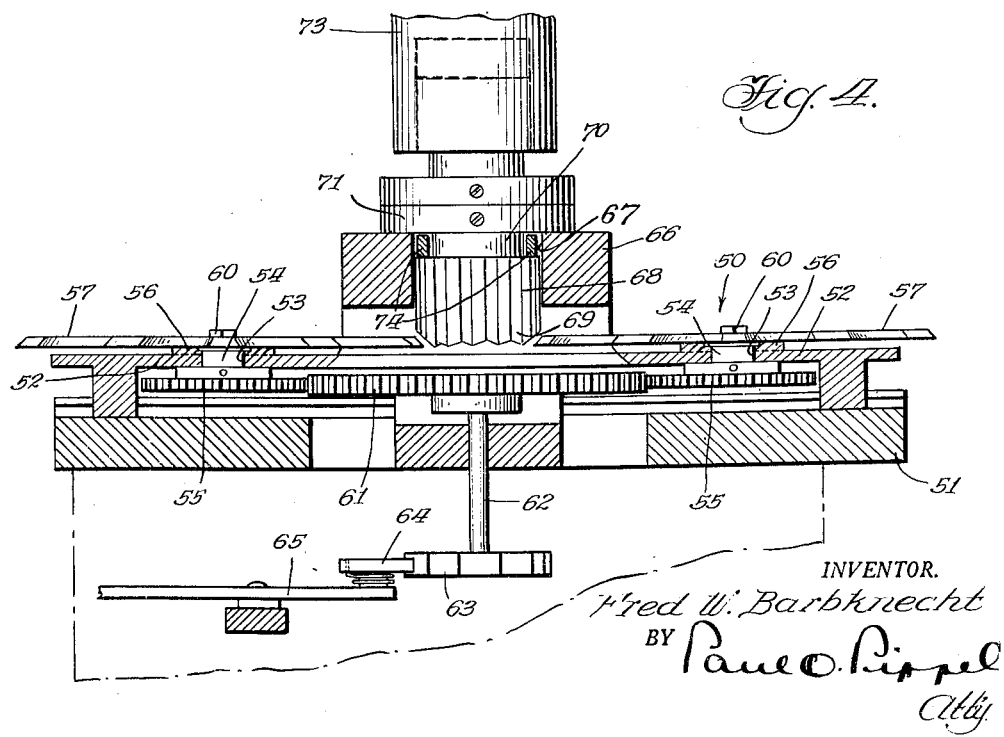
Fig. 4 is a cross-sectional view through a modified fixture or machine for beveling the edges of coulter discs.

The machine 10 above described is generally utilized for sharpening the edges of concavo-convex type of discs. The turntables 20 are so shaped as to receive the concave surfaces of the discs. In Figs. 4 and 5 a modified form of the invention is shown. In these figures a machine 50 of similar design is shown adapted to sharpen coulter type discs, these discs being of flat construction. A fixture or support is generally designated by the reference character 51. The support 51 includes supporting surfaces 52 which are provided with vertically extending bores 53. Shafts 54 are adapted to be rotated in the bores 53 by means of gears 55. The upper ends of the shafts 54 are secured to tables 56 for rotating the same.

A pair of flat coulter discs 57 are shown in position on the tables 56. The coulters include circumferentially extending notches 58 and edges 59 bordering or adjacent said notches. Bolts 60 securely mount the discs 57 to the tables 56 for rotation therewith. The gear 61 is in meshing engagement with both of the gears 55. The gear 61 is rotated by means of a shaft 62 which, in turn, is rotated by a ratchet wheel 63. The ratchet wheel 63 is turned by a pawl 64 attached to a pivotal link 65 arranged to reciprocate the pawl 64.

A support 66 extends upwardly from the fixture 51. The support 66 includes a bore 67 which is positioned centrally between the edges of the coulter discs 57. A cutter head 68 is adapted to rotate within the bore 67. The cutter head is similar to the head 36 and includes cutting edges 69. A shaft 70 extends upwardly from the cutter head 68 and into a driving or rotatable member 73. A pair of collars 71 are rigidly secured to the shaft 70. The collars 71 may be adjusted vertically and are normally utilized for limiting the downward position of the cutter head 68.

A pair of spaced arms 74 are adapted to engage the underneath sides of the collars 71 for raising and lowering the cutter head with respect to the edges of the coulter discs. In Fig. 1 the spaced arms 74 function in a similar manner for engaging the underneath portions of the collars 38' for raising and lowering the cutter head 36. It is to be understood that the shafts 38 and 70 engage the driving member 73 in vertically reciprocating relation so that the shafts may be adjusted vertically with respect to the member 73.

As best shown in Fig. 5, the machine 50 is positioned on a bolster plate 76. The underneath portion of the fixture 51 may be provided with dovetail lock members 77 adapted to engage notches in the bolster 76 in a well-known manner. The bolster plate 76 in this instance is shown as part of a power machine such as a drill press 78. It is, of course, understood that the machine 50 may be utilized with any type of power means adapted to impart rotating movement to the cutter heads 36 and 68. The spaced arm 74 may be provided with a handle 75 as best shown in Fig. 5. The handle 75 is adapted to be rotated between projecting members 80 which may project outwardly from supporting brackets 49 and 66; thus, by moving the handle vertically the arms 74 may be moved to raise and lower either of the cutter heads 36 or 68.

In the operation of the machine shown in Fig. 1, the concavo-convex discs 33 are securely connected to the turntables 20 by means of the collars 31 which are pressed into engagement with the upper surfaces of the discs. The cams 30 on the handles 29 securely position the collars against the upper surfaces of the discs. The cutter head 36 is thereupon lowered into an annular space formed by opposed edges bordering a pair of opposed notches 34. After the head 36 has been lowered the driving member 73 is set into rotating motion whereupon the cutting edges 36' of the head 36 operate to work against the edges 35 bordering the notches 34. The cutter head 36 removes material, thus beveling the edges of the disc 33 as best shown in Figs. 2 and 3. After the edges have thus been beveled the cutter head 36 is raised and the shaft 42 is thereupon rotated, thus imparting rotating movement to the gears 19 and shaft 18 for rotating the turntable 20. As the turntables 20 are thus rotated, the discs 33 are moved so that successive untreated edges 35 of the discs are indexed adjacent the cutter head 36 whereupon the cutter head 36 is again lowered and the cycle of operation is repeated.

In the modified construction shown in Fig. 4 the operation is similar. In this showing the turntables 56 may be indexed and rotated by the shaft 62 whereupon opposed notches 58 are lined up adjacent the cutter head 68. The cutter head 68 is thereupon lowered against the edges 59 for beveling or sharpening the same. When the edges have been sufficiently treated the cutter head is again raised and the cycle of operation is repeated in the same manner as in the operation shown in Fig. 1.

It can thus be seen that a novel machine and fixture for beveling the edges of coulter discs and concavo-convex discs has been provided. The operation of beveling or sharpening the edges of the discs is done in a production manner whereupon efficient and uniform beveling and sharpening is effected. It must be understood that only preferred embodiments of the invention have been shown and that changes and modification may be made which do not depart from the spirit of the invention nor the scope thereof as defined in the appended claims.

What is claimed is:

1. In a machine for treating a concavo-convex disc having circumferentially spaced notches, a supporting structure having a centrally disposed vertically extending bore, a bearing member positioned in the bore, a pair of work holding elements disposed at opposite sides of the vertically extending bore, each of said elements including a rotatable shaft, each shaft extending upwardly and outwardly with respect to the bore, a turntable connected to each shaft for rotation therewith, each turntable being positioned in angular relation with respect to the bore and having a convex surface adapted to receive a concavo-convex disc, a pair of clamps for removably securing a disc to each turntable, each clamp including an axially shiftable member having a rotatable cup shaped element arranged to be moved into engagement with a disc, a cutter head positioned between the turntables, said head including a shaft extension journalled within the bearing member of the bore, a shaft extending upwardly from the cutter head and adapted to engage a driving member in reciprocating and driving relation, means for axially moving said cutter head adjacent the notches of a pair of discs and into cutting engagement with edges bordering the notches of the discs for sharpening the edges, and means for rotating said turntables thereby successively moving unsharpened edges of the discs into position for engagement by the cutter head.

2. In a machine for treating a concavo-convex disc having circumferentially spaced notches, a supporting structure having a centrally disposed vertically extending bore, a bearing member disposed in the bore, a pair of work holding elements disposed at opposite sides of the bore, each of said elements including a rotatable shaft disposed angularly with respect to the vertical axis of said bore, a turntable connected to each shaft for rotation therewith, each turntable being positioned angularly with respect to the bore and having a convex surface adapted to receive a concavo-convex disc, a pair of clamp structures for securing the discs to the turntables, each clamp structure comprising an axially shiftable member, a support for the shiftable member, said support including a guide member for supporting the shiftable member in reciprocating relation, a spring connected to said shiftable member for urging said member in a direction away from said turntable, a cam member connected to said support, said cam member being movable for shifting said shiftable member against the action of said spring toward said turntable, a rotatable cup-shaped element connected to said shiftable member and adapted to be moved into engagement with a concavo-convex disc for securing the same on the turntable, a cutter head positioned between the turntables, said head including a shaft extension journalled within the bore, means for rotating said cutter head, means for axially moving said cutter head adjacent the notches of the discs mounted on the turntables and into cutting engagement with edges bordering the notches of the discs for sharpening the edges, and means for rotating said turntables thereby successively moving unsharpened edges of the discs into position for engagement by the cutter head.

3. In a machine for sharpening the edges of a disc comprising a supporting structure having a centrally disposed cutter support, said cutter support including an axially extending bore, a cutter head axially shiftable in said bore, said cutter head including an upwardly extending shaft adapted to engage a driving member in reciprocating relation, a pair of vertically extending bearing members disposed at opposite sides of the cutter head on said supporting structure, a shaft journalled in each bearing member, means for connecting a disc to each shaft for rotation therewith, means for axially shifting said cutter head into cutting engagement with the discs, means for rotating said discs, said means including a driven gear connected to each shaft for rotating the same, a drive gear supported on the supporting structure, said drive gear being in meshing engagement with the driven gears, and means connected to said drive gear for intermittently rotating the same thereby successively indexing unsharpened edges of said discs into position for cutting engagement by said cutter head.

FRED W. BARBKNECHT.

REFERENCES CITED

The following references are of record in the file of this patent:

UNITED STATES PATENTS

| Number | Name | Date |
| --- | --- | --- |
| 120,433 | Hawkins | Oct. 31, 1871 |
| 1,352,324 | Strain | Sept. 7, 1920 |
| 1,487,589 | Miner et al. | Mar. 18, 1924 |
| 1,635,491 | Milliken | July 12, 1927 |
| 2,082,832 | Hansen | June 8, 1937 |
| 2,353,131 | Ford | July 11, 1944 |
| 2,401,486 | Jones | June 4, 1946 |